Sept. 15, 1936.         F. A. B. FINKELDEY         2,054,156
METHOD AND APPARATUS FOR FEEDING CEMENT KILNS
Filed April 9, 1935
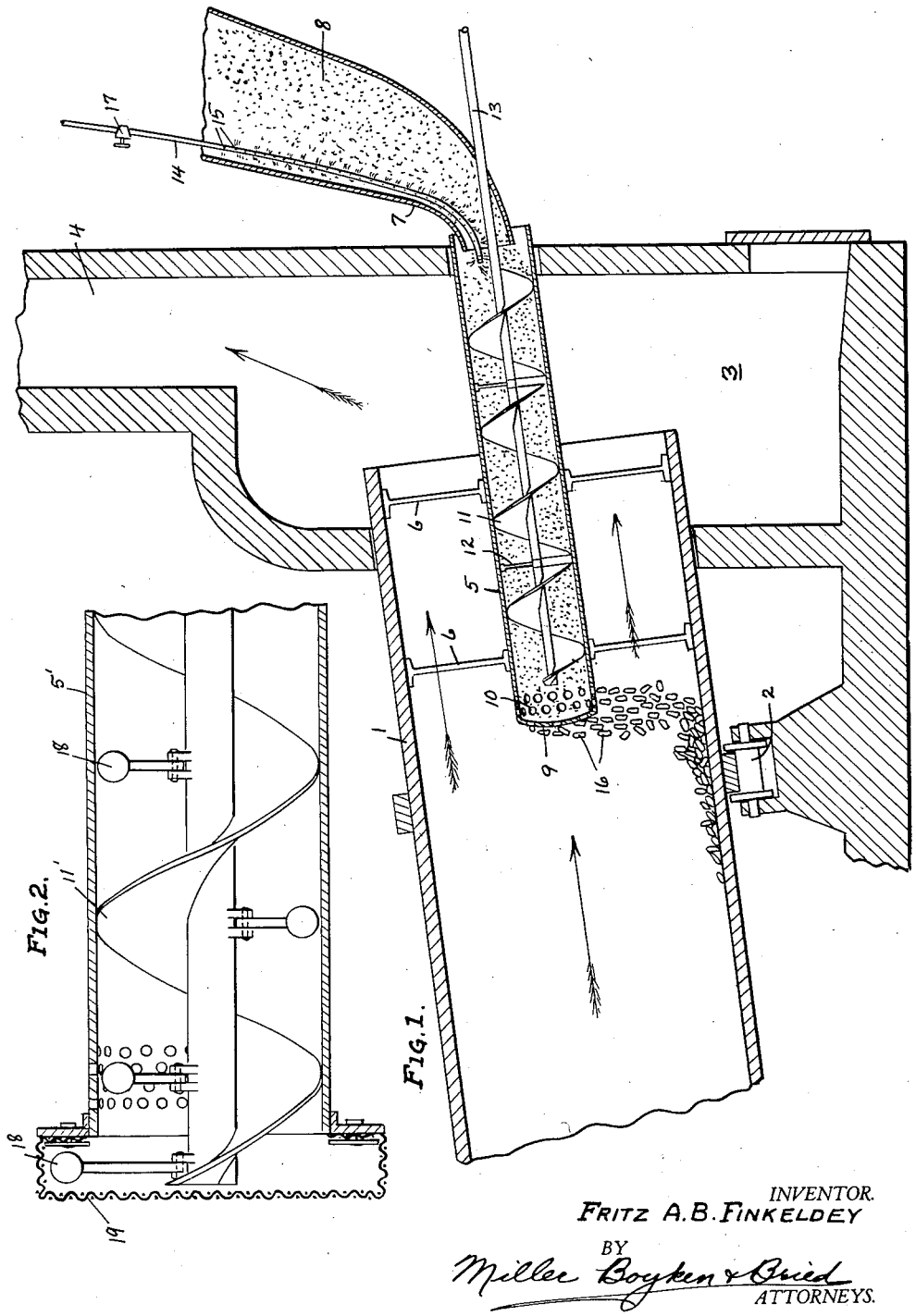
INVENTOR.
FRITZ A.B. FINKELDEY
BY
Miller Boyken & Gried
ATTORNEYS.

Patented Sept. 15, 1936

2,054,156

UNITED STATES PATENT OFFICE 2,054,156

METHOD AND APPARATUS FOR FEEDING CEMENT KILNS

Fritz A. B. Finkeldey, Santa Cruz, Calif.

Application April 9, 1935, Serial No. 15,419

7 Claims. (Cl. 263—53)

This invention relates to the manufacture of Portland cement and modifications thereof as made by burning the desired mixture of raw cement materials in a rotary kiln into the form called "clinker". The objects of the invention are to provide improvements in the manner of feeding or introducing the mixture of raw materials into the kiln and the special apparatus arrangement used therefor. Other advantages of my invention will appear in the following description and accompanying drawing.

In the drawing Fig. 1 is a longitudinal section of the upper or feeding end of a rotary cement kiln equipped with apparatus to carry out my invention.

Fig. 2 is a longitudinal section showing a modification of the screw feed apparatus.

Before describing my improvements, attention is called to the fact that in the manufacture of Portland cement in rotary kilns, either of two methods is usually practiced—the dry or the wet. In the dry method the raw mixture of finely ground limestone, clay, siliceous material, etc., is introduced as a powder to the upper end of the revolving kiln so that it will form into nodules as the kiln rotates and the material is subjected to the clinkering temperature, or that of incipient fusion. In this method there is considerable loss of material in the form of dust being blown up the furnace stack by the rush of hot gases through the kiln. This loss, without the use of special dust collecting apparatus may reach 6 or 8% of the total material introduced into the kiln.

In the wet method, the finely ground materials are mixed with water to the form of a slurry and this is run into the kiln. This method entails more labor, and also more fuel for firing a given amount of material. In neither method is there, however, a proper control of the size of the clinker nodules as these vary from fine to fairly large lumps, and which former may be over-burnt, and the latter under-burnt.

Some workers in the art of cement manufacture have tried to overcome the shortcomings of both methods by first forming the raw materials into nodules and feeding these into the kiln, but the methods and apparatus purposed have generally been too costly or impracticable.

By my invention it becomes possible and practicable to equip ordinary rotary cement kilns with simple inexpensive feeding apparatus which will form the raw finely ground cement materials into a doughy mass and force it directly into the kiln in the form of small nodules of about the size of beans or cherries, as may be predetermined, and by which method there will be produced a substantially uniform clinker product evenly burned, and without under-burned centers. Dust losses are eliminated, and owing to there being no oversize lumps to require extra long burning, the total fuel consumption will be greatly reduced.

Simple apparatus for carrying out my method is shown in Fig. 1 wherein 1 represents the upper end of a slightly inclined rotary cement kiln rotatably supported on trunnion roller 2 and with its feed end extending into a chamber 3 at the base of a stack or chimney 4 for carrying off the hot gases from the intense flame projected into the lower end of the kiln, not shown. Axially disposed within the upper end of the kiln 1 is a cylindrical tube 5 supported on suitable iron or refractory spaced spider arms 6. This tube is preferably formed of a section of large heavy steel or iron pipe and projects through the flue chamber so as to be accessible for introduction of raw material as from a spout or chute 7, and into which chute the finely ground and properly mixed and proportioned raw material 8 is constantly supplied by any form of conveyor or bin, not shown.

The inner end of feeder tube 5 extends into the kiln a substantial distance as shown in the drawing so as to feed material to the kiln well within the violent draft zone, and is closed by a thick wire screen or perforated plate 9 preferably having about ¾ inch holes, or larger or smaller, if desired, depending on the size clinker it is desired to run. There may also be additional perforations in the side wall of the tube 5 adjacent its inner or lower end as indicated at 10. Within the feeder tube is a feed screw conveyor or spiral 11 which may be mounted in hanger bearings 12, or simply fit rotatably within the tube, and which screw has its shaft 13 extending through the chute 7 and is driven, by any desired source of power, in a direction preferably opposite to that of the rotation of the kiln, so as to develop a powerful thrust on the material in the feeder tube and force it through the perforations. One or more water pipes 14, finely perforated as at 15, or other water sprays, are arranged so as to inject sufficient water into the powdered raw material so that it will be churned up to a heavy clayey mass to more or less retain its form after forcing through the apertures at the inner end of the feeder tube and will fall in a constant flow of nodulated pieces 16 into the kiln. With a constant feed of powdered raw material to the chute 7 and the water spray accurately controlled as by a valve 17 the nature of the nodulated masses forced through the perforations will also be uniform, and also the final clinker formed therefrom.

It is of course evident that wet steam may be used in place of the water spray to moisten the raw material, if desired, also that other forms of devices for forcing the moistened material through the perforations under pressure may be substituted for the feed screw shown.

In Fig. 2 a modified force feeder is shown in which the tube 5' has the conveyor screw 11' as before, but is fitted with additional swinging hammers 18 to break up any lumps formed in the mass; also the inner end of the tube is fitted with an enlarged screen cage 19 preferably made of thick wire between which the thick putty-like mass is forced.

In considering the above described invention it will be seen to be easily and cheaply applied to existing rotary cement kilns, some of which may already be equipped with screw feeders for powdered material and which simply require slight changes and additions to make them suitable for carrying out my improvement which broadly consists of forcing a plastic mass of the raw material through sizing apertures directly into a rotating kiln, or into a chute or other device emptying thereinto. It will be evident from a consideration of the description that minor changes in the apparatus may be made without departing from the spirit of the invention as sought to be covered in the appended claims.

I therefore claim:

1. The method of feeding raw cement materials free from fuel to inclined rotary kilns which comprises making a plastic mass of the materials and forcing it under pressure through nodule sizing apertures directly into the rotating kiln at a point well within the extreme upper end.

2. The method of feeding raw cement materials free from fuel to inclined rotary kilns which comprises mixing moisture with the finely ground material to form a more or less plastic mass and forcing said mass through sizing apertures directly into the kiln at a point well within the extreme upper end.

3. Apparatus for forming and feeding nodules of raw cement materials into an inclined rotary kiln comprising a feeder tube extending into the feed end of the kiln to a point well within the draft zone and provided with restricted sizing apertures at its inner end for passage of the feed material, a screw within said tube arranged for forcing plastic feed material through said sizing apertures, and means for turning said screw relative to said tube.

4. Apparatus for forming and feeding nodules of raw cement materials into an inclined rotary kiln comprising a feeder tube extending into the feed end of the kiln to a point well within the draft zone and provided with restricted sizing apertures at its inner end for passage of the feed material, a screw within said tube arranged for forcing plastic feed material through said sizing apertures, means mounting said tube to the kiln for rotation therewith, and means for additionally turning said screw relative to said tube.

5. Apparatus for forming and feeding nodules of raw cement materials into an inclined rotary kiln comprising a feeder tube extending into the feed end of the kiln to a point well within the draft zone and provided with restricted sizing apertures at its inner end for passage of the feed material, means for supplying powdered raw material and water to the tube to form a plastic mass, a screw within said tube arranged for forcing the plastic feed material through said sizing apertures, and means for turning said screw relative to said tube.

6. In apparatus as specified in claim 3, a plurality of swingingly mounted hammers carried by said screw arranged for breaking down any lumps in said plastic material.

7. Apparatus for forming and feeding nodules of raw cement materials into an inclined rotary kiln comprising a feeder tube extending into the feed end of the kiln to a point well within the draft zone and provided with restricted sizing apertures at its inner end for passage of the feed material, and means within said tube arranged for forcing plastic feed material through said sizing apertures.

FRITZ A. B. FINKELDEY.